J. W. WEINLAND.
BRAKE BEAM.
APPLICATION FILED APR. 19, 1916.
1,202,934.
Patented Oct. 31, 1916.
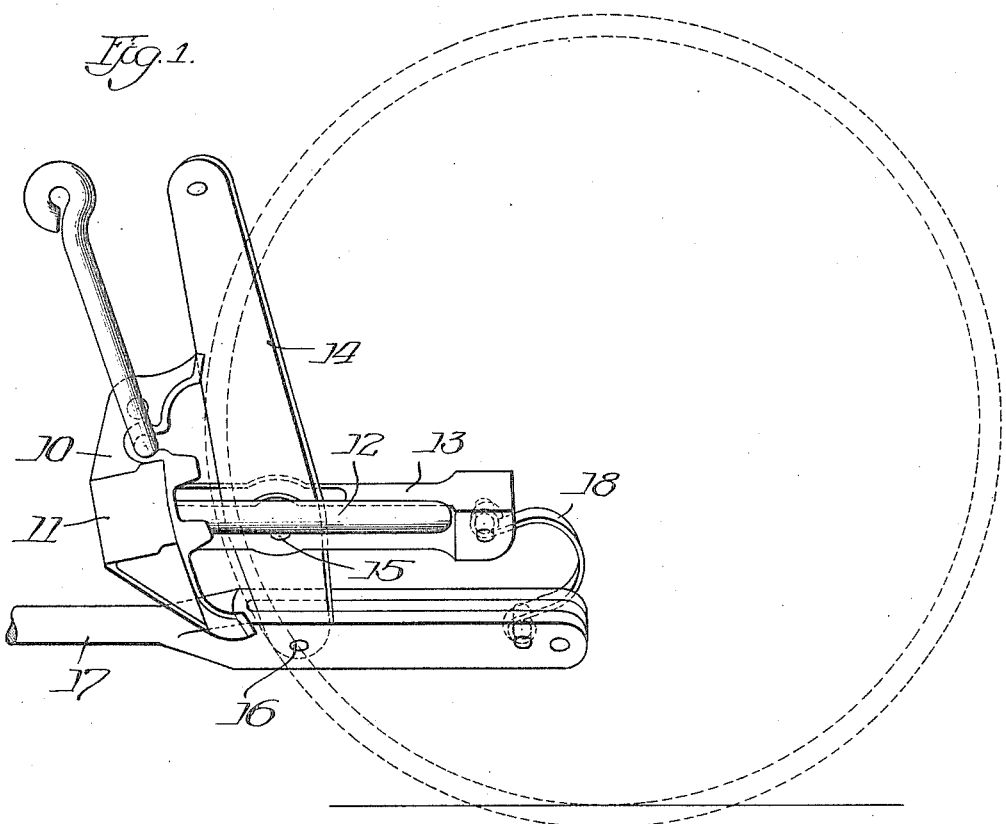
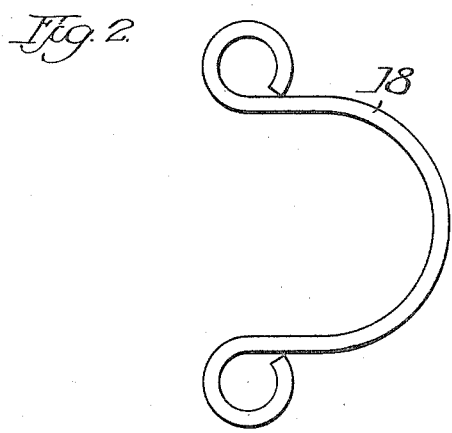
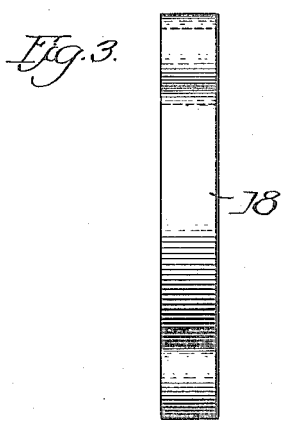

UNITED STATES PATENT OFFICE.

JOSEPH W. WEINLAND, OF CHICAGO, ILLINOIS, ASSIGNOR TO AMERICAN STEEL FOUNDRIES, OF NEW YORK, N. Y., A CORPORATION OF NEW JERSEY.

BRAKE-BEAM.

1,202,934.  Specification of Letters Patent.  Patented Oct. 31, 1916.

Application filed April 19, 1916.  Serial No. 92,117.

*To all whom it may concern:*

Be it known that I, JOSEPH W. WEINLAND, a citizen of the United States, and resident of Chicago, in the county of Cook, and State of Illinois, have invented certain new and useful Improvements in Brake-Beams, of which the following is a specification.

My invention relates to brake beams and has particular reference to a novel link for use in connection with the leveling devices or the third point support similar to that shown in the patent to Posson, No. 789,879.

It has been found in service that by providing rigid links in the connections, some of the parts were unnecessarily strained. To secure flexibility and to obviate the possibility of breakage I have provided a connecting or supporting link of U shape and formed of spring material. I thereby secure all the functions of the supporting link with the additional function of resiliency when required.

The invention will be more readily understood by reference to the accompanying drawings, wherein—

Figure 1 is a fragmentary elevation of a brake beam and third point support to which my invention has been applied; Figs. 2 and 3 are side and edge views respectively of the spring which I prefer to employ.

In the drawings it will be seen that the brake beam includes a head 10, compression member 11, tension rod 12 and strut 13. A brake lever 14 is pivoted in the strut at 15, the lower end of the lever being also pivoted at 16 in a leveling or brake connection rod 17. The outer end of the strut 13 and the outer end of the rod 17 are connected by means of a U-shaped spring metal link 18, best shown in Figs. 2 and 3. This element takes the place of the solid link heretofore used in this construction and so arranged that a limited twisting movement is permitted, such as occurs when the brakes are set without placing undue strain on any of the parts. The metal composing the link will be rather heavy in order that no deflection will occur in ordinary operations. The exact shape of the spring metal link will depend upon the amount of deflection found necessary. Therefore, I do not wish to be limited to the exact form shown in the drawings.

I claim:

1. In a brake beam, the combination of a brake beam strut, a brake lever projecting through said strut, a spring link connected to the end of said strut and a rod to which the end of said lever and said link are connected, substantially as described.

2. In a third point support, the combination of a brake beam strut, a brake lever pivoted to said strut and having a portion projecting on both sides thereof, a U-shaped spring link also secured to said strut and projecting in substantial parallelism with one end of said lever, and a connecting rod to which said lever and said link are connected.

3. In a brake beam, the combination of a strut, a brake lever pivoted in said strut and having a portion projecting diagonally downward from said strut, a U-shaped spring link projecting downwardly from the ends of said strut in a line with said lever and a connecting rod mounted beneath said beam and to which said lever and said link are connected, substantially as described.

Signed at Chicago, Illinois, this 14th day of April, A. D. 1916.

JOSEPH W. WEINLAND.

Witnesses:
T. D. BUTLER,
H. C. JACOBS.